Oct. 7, 1958        A. A. RICHARDSON        2,855,597
DIRECTIVE RECEIVING SYSTEM AND APPARATUS
Filed Aug. 23, 1954
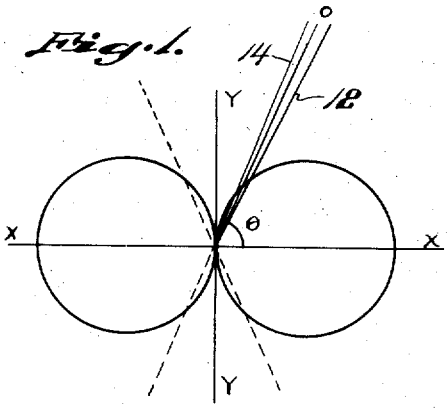
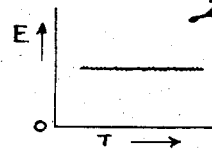
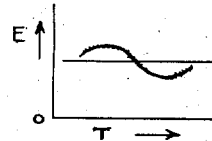
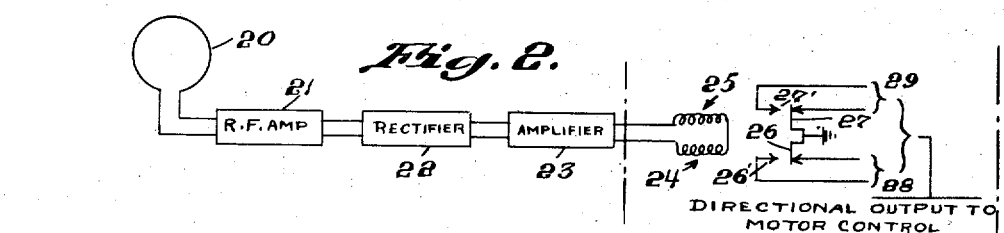
INVENTOR.
Arthur A. Richardson
BY
Barlow & Barlow
ATTORNEYS.

United States Patent Office 2,855,597
Patented Oct. 7, 1958

2,855,597

DIRECTIVE RECEIVING SYSTEM AND APPARATUS

Arthur A. Richardson, Cranston, R. I.

Application August 23, 1954, Serial No. 451,402

13 Claims. (Cl. 343—117)

This invention relates to a radio frequency receiving system and more particularly to a receiving system including a loop antenna as the pick-up source and a voltage sensitive amplifier responsive to variations in detected voltage output.

Many systems for guiding boats have been devised which basically depend upon a magnetic or gyrocompass as the direction standard and which are responsive to changes from a preset direction. One of the drawbacks of the prior systems has been the cost, which has been prohibitive for small boat operators. There exists a need for an inexpensive device which will accurately serve the same purpose as the more expensive units and utilize existing equipment found on most small vessels.

It is therefore one of the objects of this invention to utilize a radio direction finder as the receiving apparatus and attach to this direction finder a simple device which will indicate changes from a preset angle.

A further object of the invention is to operate a radio direction finder on other than the null position of the loop and detect changes in voltage from a predetermined value.

In the drawings:

Figure 1 is a diagram in polar coordinates showing the method of operation of the invention;

Figure 2 is a circuit diagram of one form of the invention including a complete system;

Figure 3 is a circuit diagram of another form of the invention as applied to a directional receiving apparatus;

Figures 4 and 5 are wave form diagrams illustrating a detector output;

Figure 6 is a schematic of a motor control adaptable for use with the invention; and Figure 7 is a circuit diagram of a modified form of relay control adaptable to the invention.

It is well known that a closed loop antenna will exhibit a certain directive pick-up pattern, and it can be shown for a simple rectangular single-turn loop of a dimension much less than a wave length that the voltage across the loop terminals will be proportional to the cosine of the angle between the plane of the loop and the direction of the radio signal as taken from the rotational center of the loop. Such a pattern is shown in Figure 1 of the drawings in which the circles represent the voltage induced in the loop as it is rotated throughout 360 degrees. Considering a point source O, it will be seen that the voltage induced in the loop will be proportional to the cosine of angle $\theta$. With angles of $\theta$ between 90° and 60° there will be a fairly uniform large deviation in voltage for a small change in angle. In utilizing this physical fact by merely adding an apparatus to detect these voltage changes, a rather accurate bearing change indicator can be made. Carrying this principle further, it can be seen that if the point source O is sufficiently far away from a vessel, the change in angle will be very small over short courses running at angles approaching 90° to the station and thus can be utilized to actuate a steering mechanism to keep a vessel on a given course. It will be readily apparent that if the station is nearly ahead or astern, the distance of the station from the vessel is of no import.

In Figure 2 I have shown diagrammatically means of operating such a system in which 20 designates a loop antenna that is coupled to suitable radio frequency amplifiers 21, the output of which is sufficient to be detected in a rectifier 22 and thence amplified in amplifier 23, the output of which to be applied to series arranged current sensitive relays 24 and 25. The basic requirements of the system, in addition to the loop antenna, is a detector to which sufficient signal is fed, the detector furnishing sufficient output, directly or through amplifiers, to actuate relays. Each of the relays has an armature 26 and 27, respectively, that through contacts 26', 27' control the circuit condition of circuits 28 and 29, respectively. For a steady carrier radio frequency source, there will appear at the output of the rectifier 22 a voltage wave form such as is shown in Figure 4, which is a plot of voltage versus time and displays a slight ripple that is the result of non-complete rectification of the carrier frequency. Similarly, if an amplitude modulated sine wave signal is applied to the input of the rectifier 22, there will appear at the output thereof a wave form similar to that shown in Figure 5, in which the basic wave shape, here shown as a sine wave, is at the frequency of modulation and the ripple is the carrier frequency. Both of these detected voltage outputs have a certain value above ground, and by utilizing this value and adjusting the input of amplifier 23 to accept such a value, relays 24 and 25 may be made sensitive to slight variations. Thus, should the mean angle to the point source O vary a slight amount to that at indicated by line 12 in Figure 1, it can be seen that an increase in voltage will result in the output of the rectifier 22, which will be amplified and actuate one of the relays 24, 25 that is responsive to a change in current above the mean value. Similarly, should the angle of bearing change to that represented by line 14 in Figure 1, a smaller voltage will be detected and applied to the amplifier 23, resulting in the actuation of relay 24, 25 which is responsive to a decrease in current. For example, one relay may be set to operate at 1.0 milliampere and release at 0.7 milliampere while the second relay may be set to operate at 0.60 milliampere and release at 0.30.

Assume, therefore, that the relays are set to operate in the ranges mentioned above. It will be understood that the operating point for the overall system is at a current value between .6 ma. and .7 ma. This will be the null position in which no relay is actuated and accordingly, if there is a rise in current from this mean operating range, one relay will operate; while if there is a decrease of current from this mean operating range, the other relay will operate. In a system of this type, the relays will work in either a series or a parallel arrangement as shown in Fig. 7, it will be understood that identical relays may be utilized and, if necessary, a series resistance can be inserted in series with one of the relays so as to vary its operating characteristics as is well known in the relay art.

In Figure 3 there is shown the exact same system of Figure 2 as applied to a radio receiver having a loop antenna 20, the radio receiver being generally designated 30 and consisting of a superheterodyne circuit including r. f. amplifiers 31 and a suitable detector 32. In the usual form, a detector is a non-linear device such as a vacuum tube diode which is provided with some filtering means such as a capacitor 33 and possibly other RC networks to convert the audio modulation of the radio frequency carrier to a pure audio signal. Since this voltage variation at the detector output is also proportional to the input radio frequency voltage, it is sometimes used in what is known as AVC circuits that regulate the gain of the prior radio frequency amplifier stages. Thus, the line 34 may represent an AVC line, and it is this varying voltage that may be applied through a suitable isolation resistor 35 to the input of an amplifier 36 that is coupled to two current sensitive relays 37 and 38 that are provided with armatures 39 and 40 and coils 41, 42, respectively. Each of the armatures 39 and 40 are associated with contacts 43 and 44, respectively, which change the circuit conditions in leads 45, 46. Should the source of radio frequency be a MCW one, it will then be readily appreciated that the amplifier 36 may be dispensed with, the output of the audio amplifier in the receiver 30 being fed directly to the relays 37, 38.

To illustrate a complete application of my system, I have shown in Figure 6 a motor control circuit in which M designates a motor having a field 50F and an output shaft 50 that may be utilized to control the steering of a vessel through suitable mechanical or hydraulic control. The output leads 28, 29 of Figure 2 or 45, 46 of Figure 3 may be considered connected to input terminals 51, 52 which will be seen to control the application of a voltage source indicated by + and the common ground symbol across relay coils 53, 54. Associated with each of the relay coils 53 and 54 is an armature 55, 56 that in turn controls the application of voltage to the coils 60 and 61 of motor control relays. Each of these relays in turn have armatures 62 and 63 which control the direction of the D. C. source as applied across the motor armature so as to reverse the motor in a manner well known to those skilled in the art. Certain auxiliary switches are contained in the motor control circuit such as a switch 70 that has a center leaf 71 coupled to the shaft 50 and acts as a center limit switch. Additionally, two over-limit switches 72 and 73 are provided having center leaves 74, 75 coupled to the shaft 50 that are intended to limit the amount of rotation of the shaft 50. To provide for manual control of the motor M, there are provided two switches 80 and 81 which are adapted to open and close the circuits represented by terms 51 and 52 so that manual control of the motor M may be effected.

In operation, it is merely necessary to pick a source of radio frequency energy that is approximately fifteen-twenty miles away from the vessel running at angles approaching 90° from the course or any distance away for angles approaching zero or 180° to the course so that the angle change of bearing from this source will be at a minimum for any given distance traversed. The loop antenna of the radio receiving system is then oriented at an angle such as $\theta$ shown in Figure 1 and the gain of the amplifier on the output of the detector is varied so that neither output current sensitive relays will be operative. Assuming that the vessel is on the desired course, it will remain there over small distances. Should it attempt to vary one way or the other thereby changing the bearing to the source O, the voltage output of the amplifier coupled to the output of the detector will vary, closing one or the other of the output relays depending upon the angle variation and closing contacts 51 and 52 of the motor control circuit as shown in Figure 6. This will actuate the motor M and revolve the shaft 50 in the desired direction, which will apply rudder correction to the vessel and put it back on course. As soon as this has been accomplished, the motor control circuit will become inoperative and the cycle may be repeated any number of times for any angular deviation from the desired course. It will therefore be seen that I have provided a relatively simple arrangement that may either be attached to an existing radio receiver having a loop antenna or to a complete unit having a loop antenna so that the equipment will serve two purposes, that of taking relative bearings on sources of radio frequency energy, and that of maintaining the vessel on a desired course over a limited distance.

Certain modifications may, of course, be made to the circuitry as described above without departing from the spirit of the invention. For instance, voltage sensitive relays may be substituted for the current sensitive relays 24 and 25 (Figure 2) resulting in the circuit as shown in Figure 7 in which the voltage sensitive relays are designated 24a, 25a. In this instance, of course, the relays must be connected in parallel rather than in series as in the previous example in order to render them voltage sensitive. Additionally, the number of relays that are made sensitive to various circuit conditions, such as current and voltage, may be increased beyond the two as shown in order to effect additional control to a steering or other utilization mechanism. Should, for example, four relays be utilized, they may all be made sensitive to different values so that the varying degrees of swing of a vessel may be correspondingly compensated for.

I claim:

1. In a loop antenna receiving system, in combination, a single loop antenna exihibiting directional characteristics, a radio frequency detector coupled to said loop, a voltage sensitive amplifier coupled to said detector, and at least two sensitive relays coupled to the output of said amplifier responsive to non-overlapping and different ranges of values.

2. A receiving system as in claim 1 wherein the relays are current sensitive and respond to a differential range of currents less than one milliampere from each other.

3. A receiving system as in claim 1 wherein the relays are voltage sensitive and respond to a different range of voltages less than one volt from each other.

4. An attachment for a single loop antenna receiver comprising a detector adapted to be coupled to the signal in the receiver and at least two sensitive relays coupled to the output of said detector, said relays responsive to different output levels which are non-overlapping.

5. An attachment for a loop antenna receiver comprising at least two sensitive relays adapted to be coupled to a detected signal in said receiver, said relays responsive to different ranges of values which are non-overlapping.

6. An attachment as in claim 5 wherein the relays are current sensitive and respond to ranges of currents less than one milliampere from each other.

7. A receiving system as in claim 5 wherein the relays are voltage sensitive and respond to ranges of voltages less than one volt from each other.

8. An attachment for a loop antenna superheterodyne receiver comprising a voltage sensitive amplifier adapted to be coupled to the detector output of the receiver and at least two sensitive relays coupled to the output of said amplifier, said relays responsive to non-overlapping and different ranges values.

9. An attachment for a loop antenna receiver as in claim 8 comprising a detector adapted to be coupled to the signal in the receiver and at least two sensitive relays coupled to the output of said detector, said relays responding to different ranges of output levels.

10. A receiving system as in claim 8 wherein the relays are voltage sensitive and respond to ranges of voltages less than one volt from each other.

11. An attachment for a single loop antenna receiver comprising a voltage sensitive amplifier adapted to be coupled to a detected signal in said receiver and at least two current sensitive relays coupled to the output of said amplifier, said relays responsive to different ranges of amperage values.

12. An attachment for a loop antenna receiver as in claim 11 comprising a detector adapted to be coupled to the signal in the receiver and at least two sensitive relays coupled to the output of said detector, said relays responding to different ranges output levels.

13. A receiving system as in claim 11 wherein the relays are voltage sensitive and respond to ranges of voltages less than one volt from each other.

References Cited in the file of this patent

UNITED STATES PATENTS

| | | |
|---|---|---|
| 1,370,688 | Hammond | Mar. 8, 1921 |
| 1,387,850 | Hammond | Aug. 16, 1921 |
| 2,109,475 | Fanning | Mar. 1, 1938 |
| 2,247,294 | Goble et al. | June 24, 1941 |